D. C. Ripley,

Glass Mold.

No. 104,205.    Patented June 14, 1870.

Witnesses: Thos. P. Kerr, R. H. Drenshall
Inventor: D. C. Ripley,
by Bakewell & Christy,
his Att'ys.

United States Patent Office.

DANIEL C. RIPLEY, OF BIRMINGHAM, PENNSYLVANIA.

Letters Patent No. 104,205, dated June 14, 1870.

IMPROVED MOLD FOR GLASS LAMPS.

The Schedule referred to in these Letters Patent and making part of the same

*To all whom it may concern:*

Be it known that I, DANIEL C. RIPLEY, of the borough of Birmingham, in the county of Allegheny and State of Pennsylvania, have invented a new and useful Improvement in Glass-Lamp Mold; and I do hereby declare the following to be a full, clear, and exact description thereof, reference being had to the accompanying drawing making a part of this specification, in which—

Like letters of reference indicate like parts in each.

The nature of my invention consists in the construction of a mold having a central cavity for the insertion of a center-piece, stock, or stem, and two or more side communicating cavities, in which to blow simultaneously onto such center-piece, stock, or stem a corresponding number of lamp-bowls.

To enable others skilled in the art to make and use my invention, I will proceed to describe its construction and mode of operation.

My improved mold is of the class commonly known as a divided or two-part mold.

The opposite halves *a a'* of the body are made in the usual way, as likewise the opposite halves *b b'* of the upper part, through the cavities *s s'* of which the blowing is done, and in which cavities the necks are formed.

At or near the middle of the mold, and in each half, I make a cavity, *c*, of the size and form to receive a center-piece, *d*, which is previously made of glass by being pressed in a suitable mold.

Figure 1:
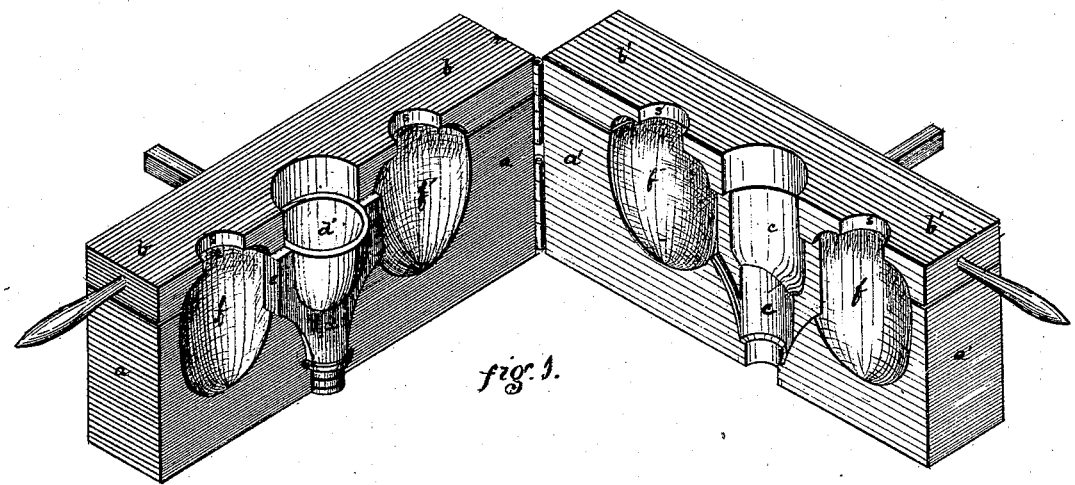
Figure 1 is a view, in perspective, of the inside of my improved mold.
Figure 2:
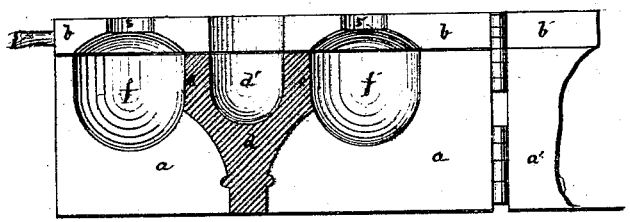
Figure 2 is an inside view, in elevation, of one-half of the mold.
Figure 3:
Figure 3 is a perspective view of one form of center-piece which I use in connection with my improved mold in the manufacture of double-bowled glass lamps.

This center-piece may be of any desired form. It may be an ordinary lamp-peg, or have a match-box, *d'*, pressed in it. It should, however, have side flanges, *e*, to a number equal to the lamp-bowls desired, and correspondingly arranged, such flanges projecting far enough, so that their outer edges shall, when the center-piece is inserted in its cavity, as in figs. 1 and 2, be flush with the faces of the bowl-cavities *f f'*, which latter are made in any desired number in the plane of "part," or division of the body of the mold, and around the central cavity *c*, and are of the size and shape desired in the lamp-bowls to be made.

The molds being thus constructed, the body part *a a'* is closed together and fastened in any convenient way, the center-piece, stock, or stem *d* first being inserted in its cavity *c*, as described. Two "blowers" then gather on the ends of their punty-rods each an amount of melted glass to form a lamp-bowl of the size desired, insert the same in the cavities *f f'*, and, as soon as the upper hinged parts *b b'* are closed together, proceed to blow simultaneously a glass lamp-bowl in each said cavity onto each flange *e*, the melted glass of the one and the solid glass of the other readily uniting to form a firm and durable union. As soon as the glass is set, the mold is opened, the lamp removed, and the work continued.

The lamp thus produced may be finished up in any of the ways known to the art.

By the use of a "three-part" instead of a "two-part" mold, with a stem-cavity in the center, and a bowl-cavity in each "part" or plane of division, a three-bowled lamp may be produced in like manner.

Instead of interposing a center-piece between the bowl-cavities, such cavities may be arranged close together, and open into each other, so that, in the operation of blowing, each bowl shall be blown onto or against the other, and then any suitable mode of mounting the lamp-bowls may be adopted.

What I claim as my invention, and desire to secure by Letters Patent, is—

A lamp-mold having two or more cavities, *f f'*, communicating with each other, either directly, or through an interposed central cavity, in which to blow two or more lamp-bowls by distinct though simultaneous operations, substantially as described.

In testimony whereof, I, the said DANIEL C. RIPLEY, have hereunto set my hand.

DANIEL C. RIPLEY.

Witnesses:
G. W. RANKIN,
G. H. CHRISTY.